(12) United States Patent
Branson et al.

(10) Patent No.: US 9,122,725 B2
(45) Date of Patent: Sep. 1, 2015

(54) TUPLE ROUTING IN A STREAMING APPLICATION

(71) Applicant: International Business Machines Corporation, Armonk, NY (US)

(72) Inventors: Michael J. Branson, Rochester, MN (US); John M. Santosuosso, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 189 days.

(21) Appl. No.: 13/706,876

(22) Filed: Dec. 6, 2012

(65) Prior Publication Data

US 2014/0164355 A1    Jun. 12, 2014

(51) Int. Cl.
*G06F 17/30* (2006.01)

(52) U.S. Cl.
CPC ................... *G06F 17/30516* (2013.01)

(58) Field of Classification Search
CPC ............ G06F 17/30516; G06F 17/30463; G06F 11/0754
USPC .......................................................... 707/718
See application file for complete search history.

(56) References Cited

U.S. PATENT DOCUMENTS

| | | | |
|---|---|---|---|
| 7,613,848 B2 | 11/2009 | Amini et al. | |
| 7,644,110 B2 | 1/2010 | Nishizawa et al. | |
| 8,060,614 B2 | 11/2011 | Goldstein et al. | |
| 8,095,690 B2 | 1/2012 | Kashiyama et al. | |
| 2009/0125660 A1* | 5/2009 | Nemirovsky et al. | 710/260 |
| 2009/0313614 A1 | 12/2009 | Andrade et al. | |
| 2010/0131543 A1* | 5/2010 | Chkodrov et al. | 707/765 |
| 2012/0179809 A1 | 7/2012 | Barsness et al. | |
| 2012/0218268 A1 | 8/2012 | Accola et al. | |
| 2013/0006962 A1* | 1/2013 | Hill | 707/714 |

OTHER PUBLICATIONS

Ballard et al., "IBM InfoSphere Streams: Harnessing Data in Motion", Sep. 2010. 360 pages, IBM Redbooks. http://www.redbooks.ibm.com/abstracts/sg247865.html.
Santosuosso et al., "Management System for Processing Streaming Data", filed Jul. 26, 2011. U.S. Appl. No. 13/190,810.
Branson, M., et al., "Tuple Routing in a Streaming Application", U.S. Appl. No. 13/776,809, filed Feb. 26, 2013.

* cited by examiner

*Primary Examiner* — Jean B Fleurantin
*Assistant Examiner* — Evan Aspinwall
(74) *Attorney, Agent, or Firm* — Nicholas D. Bowman; James R. Nock

(57) ABSTRACT

A system and method for modifying the processing within a streaming application are disclosed. The method may determine one or more parameters for a tuple at a first stream operator. The one or more parameters may represent a processing history of the tuple at the first stream operator. The method may associate the one or more parameters with the tuple metadata. A second stream operator may modify the processing of the tuple if the parameter falls outside a threshold.

17 Claims, 9 Drawing Sheets

TUPLE ROUTING IN A STREAMING APPLICATION

FIELD

This disclosure generally relates to stream computing, and in particular, to computing applications that receive streaming data and process the data as it is received.

BACKGROUND

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method, system, and computer program product for processing data. The method, system, and computer program receive streaming data to be processed by a plurality of processing elements comprising one or more stream operators.

Embodiments of the disclosure provide a method, system, and computer program product for processing data. The method, system, and computer program receive streaming data to be processed by a plurality of processing elements comprising one or more stream operators.

One embodiment is directed to a method for processing a stream of tuples in a streaming application. The method may include modifying processing of a tuple in a streaming application. The method may determine one or more parameters for a tuple at a first stream operator. The one or more parameters may represent a processing history of the tuple at the first stream operator. The method may associate the one or more parameters with the tuple. A second stream operator may modify the processing of the tuple if the parameter falls outside a threshold.

Another embodiment is directed to a system for processing a stream of tuples in a streaming application. The system may determine whether to modify the processing of a tuple in a streaming application. The system may include first and second stream operators. The first stream operator may determine one or more parameters for a tuple, the one or more parameters representing a processing history of the tuple at the first stream operator. The system may associate the one or more parameters with the tuple. The second stream operator may modify the processing of the tuple if the parameter falls outside a threshold.

Yet another embodiment is directed to a computer program product.

BRIEF DESCRIPTION OF THE DRAWINGS

Like reference numbers and designations in the various drawings indicate like elements.

DETAILED DESCRIPTION

Figure 1:
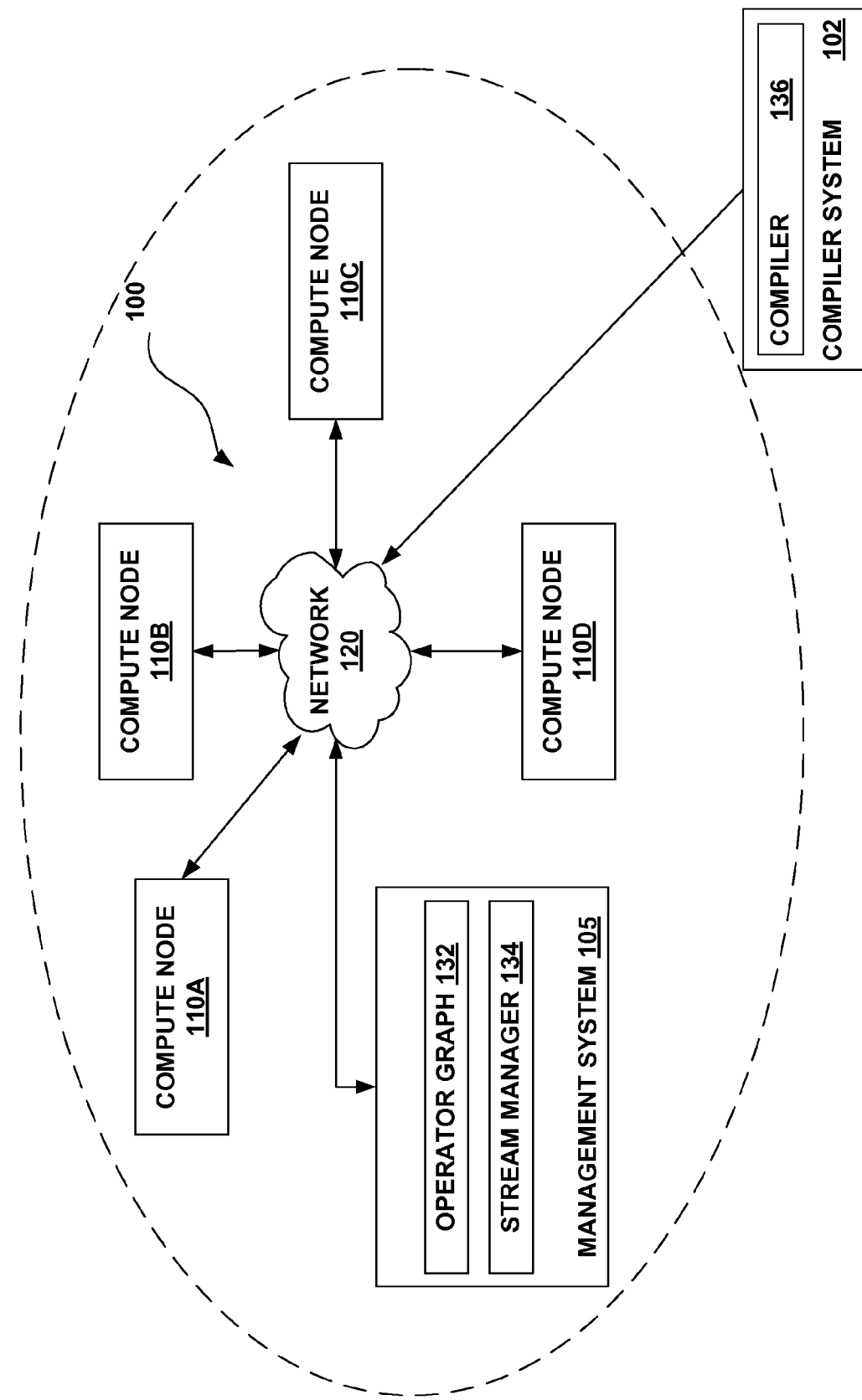
FIG. 1 illustrates a computing infrastructure configured to execute a stream computing application according to various embodiments.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream-based computing application, stream operators are connected to one another such that data flows from one stream operator to the next (e.g., over a TCP/IP socket). Stream operators may be classified into levels. A level, as referred to herein, may be defined as a number of subsequent stream operators from a particular stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application.

A "tuple" is data. More specifically, a tuple is a sequence of one or more attributes associated with an entity. Examples of attributes may be any of a variety of different types, e.g., integer, float, Boolean, string, etc. The attributes may be ordered. A tuple may be extended by adding one or more additional attributes to it. In addition to attributes associated with an entity, a tuple may include metadata, i.e., data about the tuple. Metadata corresponding to a tuple may include one or more data processing parameters. A data processing parameter, as used herein, may refer to various parameters that may describe the processing history of a tuple as it is processed in a streaming application. For example, a data processing parameter may contain information describing the amount of time that a stream operator takes to process a tuple. As used herein, "stream" or "data stream" refers to a sequence of tuples. Generally, a stream may be considered a pseudo-infinite sequence of tuples.

A window, as referred to herein, is a logical container for tuples received by an input port of a stream operator. Windowing may allow for creation of subsets of data within a streaming application. A stream operator may not necessarily support windowing by default. A stream operator may, however, be configured to support windowing. Both tumbling and sliding windows may store tuples according to various conditions. A tumbling window may store incoming tuples until the window is full, then may trigger a stream operator behavior, flush all stored tuples from the window, and then may begin this process again. Conversely, a sliding window does not automatically flush the window when the trigger condition is fulfilled. A sliding window also has an eviction policy that tells the window when to flush the window and begin this process again. These conditions may be referred to herein as windowing conditions. Windowing may be defined in any number of ways. For example, an application programmer may define one or more specific windowing conditions. Additionally, the system may provide a set of windowing conditions.

A punctuation is a control signal that appears interleaved with the tuples in a stream. The punctuation may, for example, notify the stream operator of the grouping of tuples to be processed. An example of where punctuation may be used is within an Aggregate stream operator. Every time the stream operator receives a punctuation, it may aggregate the accumulated tuples since the last window punctuation.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second.

Embodiments disclosed herein are directed to methods and apparatuses that enhance the ability of a streaming application to efficiently and rapidly process a received data stream. In one embodiment, a stream operator may be configured to determine information describing how a particular tuple has been processed throughout the streaming application. The processing information for a particular tuple may include details about how the tuple has been processed in the streaming application and may include processing time information, information about changes to the data, or information about events the data may have caused. This processing information may be used to set one or more data processing parameters. Data processing parameters may also be referred to as parameters. The value of the data processing parameters may be compared with a corresponding threshold value that may allow the streaming application to determine how to process the tuple. If the value of the data processing parameter falls outside the threshold, the tuple may require additional processing or modified processing, and may be routed down an execution path in accordance with that determination. The processing determination may be made without considering the value of the tuple attributes.

FIG. 1 illustrates one exemplary computing infrastructure 100 that may be configured to execute a stream-based computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

Figure 2:
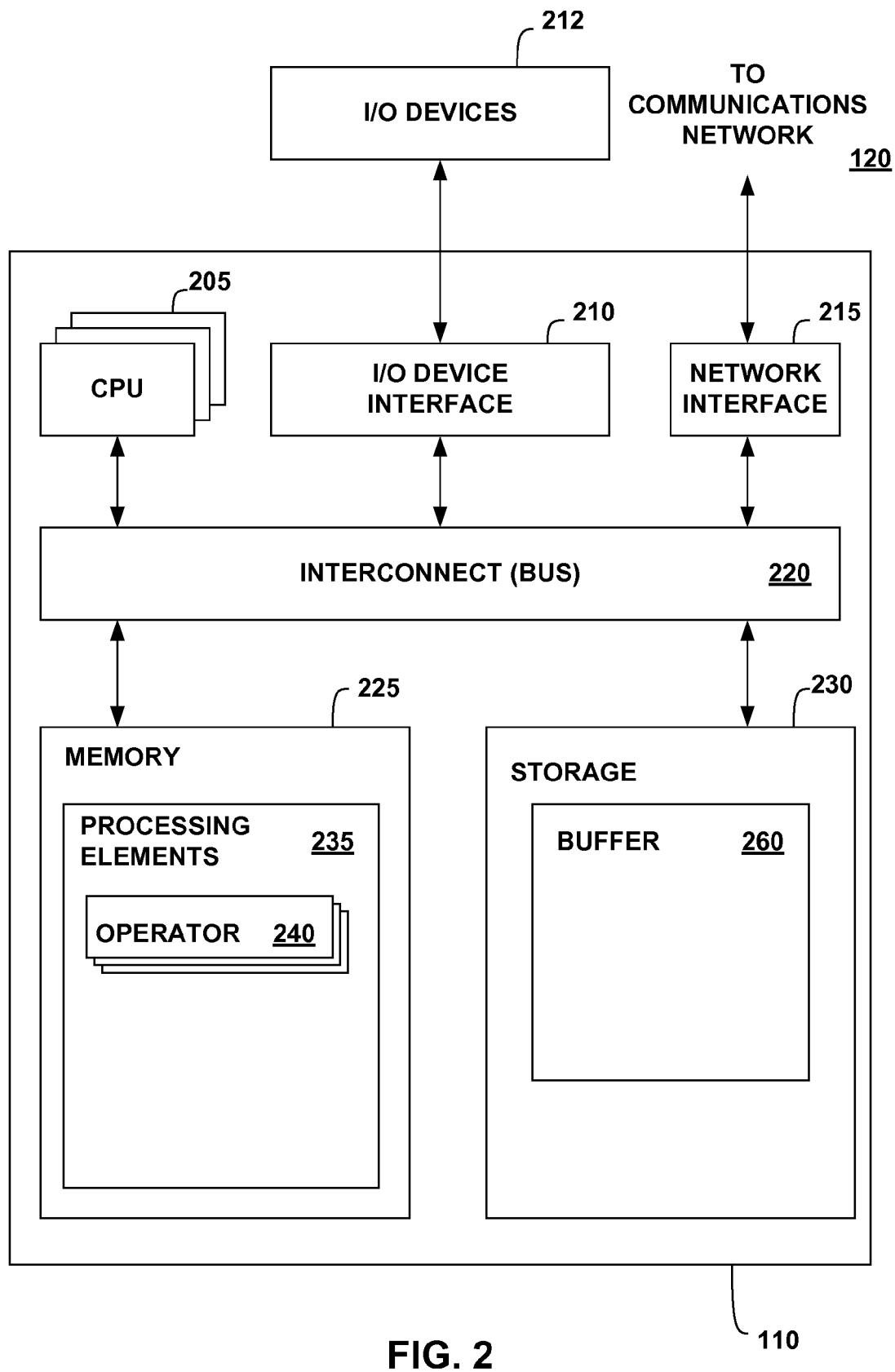
FIG. 2 illustrates a more detailed view of a compute node of FIG. 1 according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A streams application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

Figure 3:
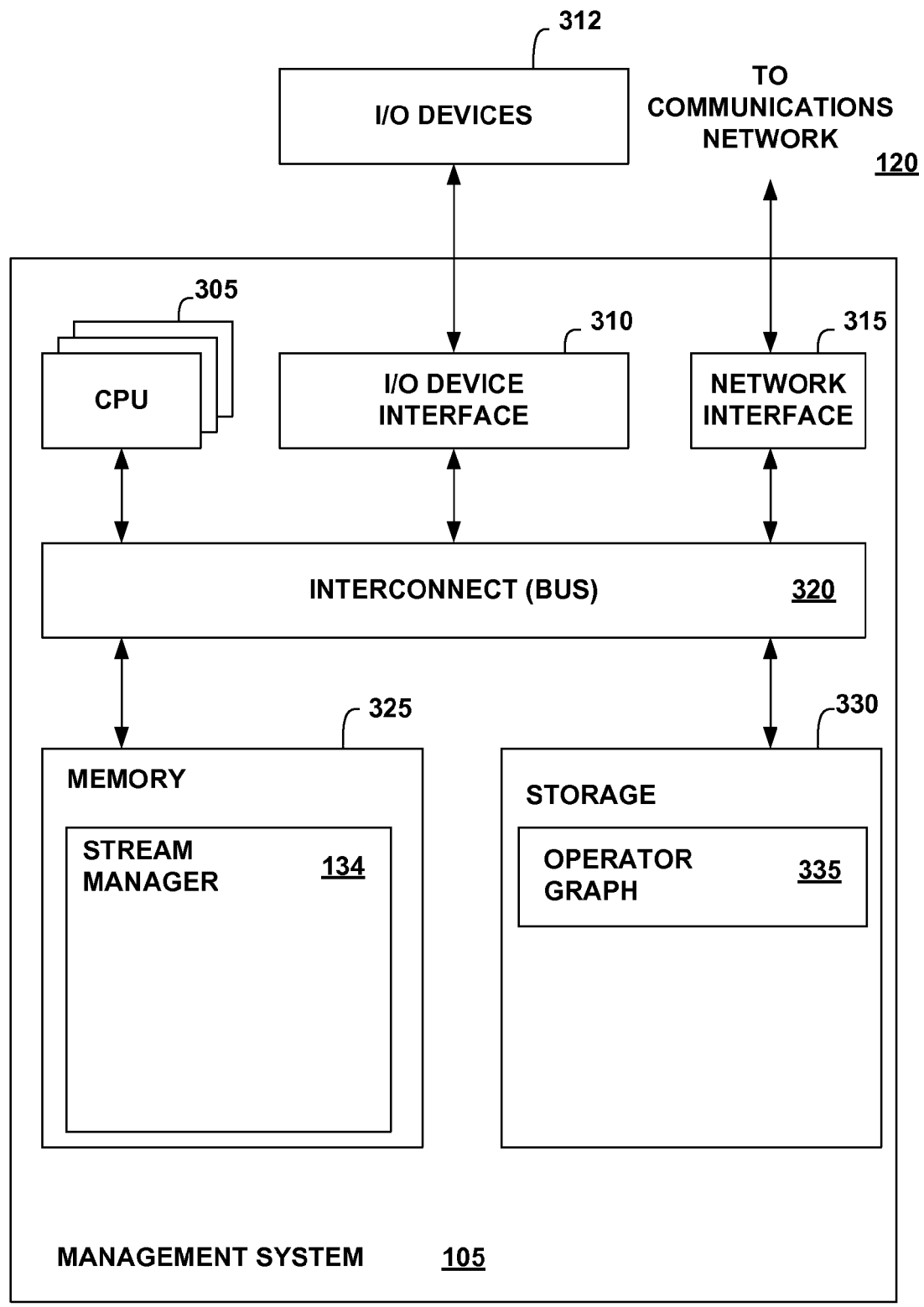
FIG. 3 illustrates a more detailed view of the management system of FIG. 1 according to various embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 2) for processing.

Figure 4:
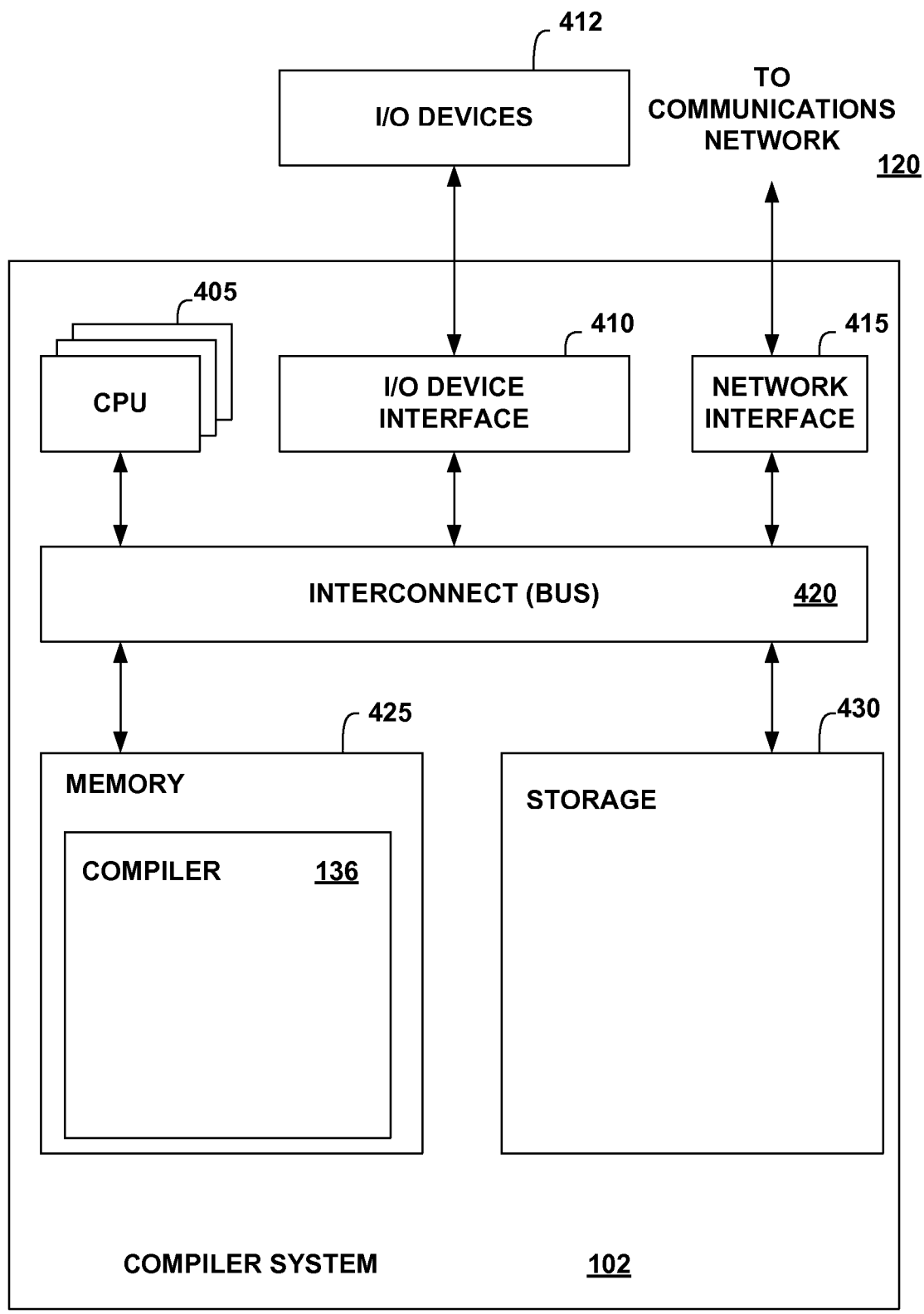
FIG. 4 illustrates a more detailed view of the compiler system of FIG. 1 according to various embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, Flash memory devices, network attached storage (NAS), connections to storage area-network (SAN) devices, or to the cloud. The network interface 415 is configured to transmit data via the communications network 120.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the streaming application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
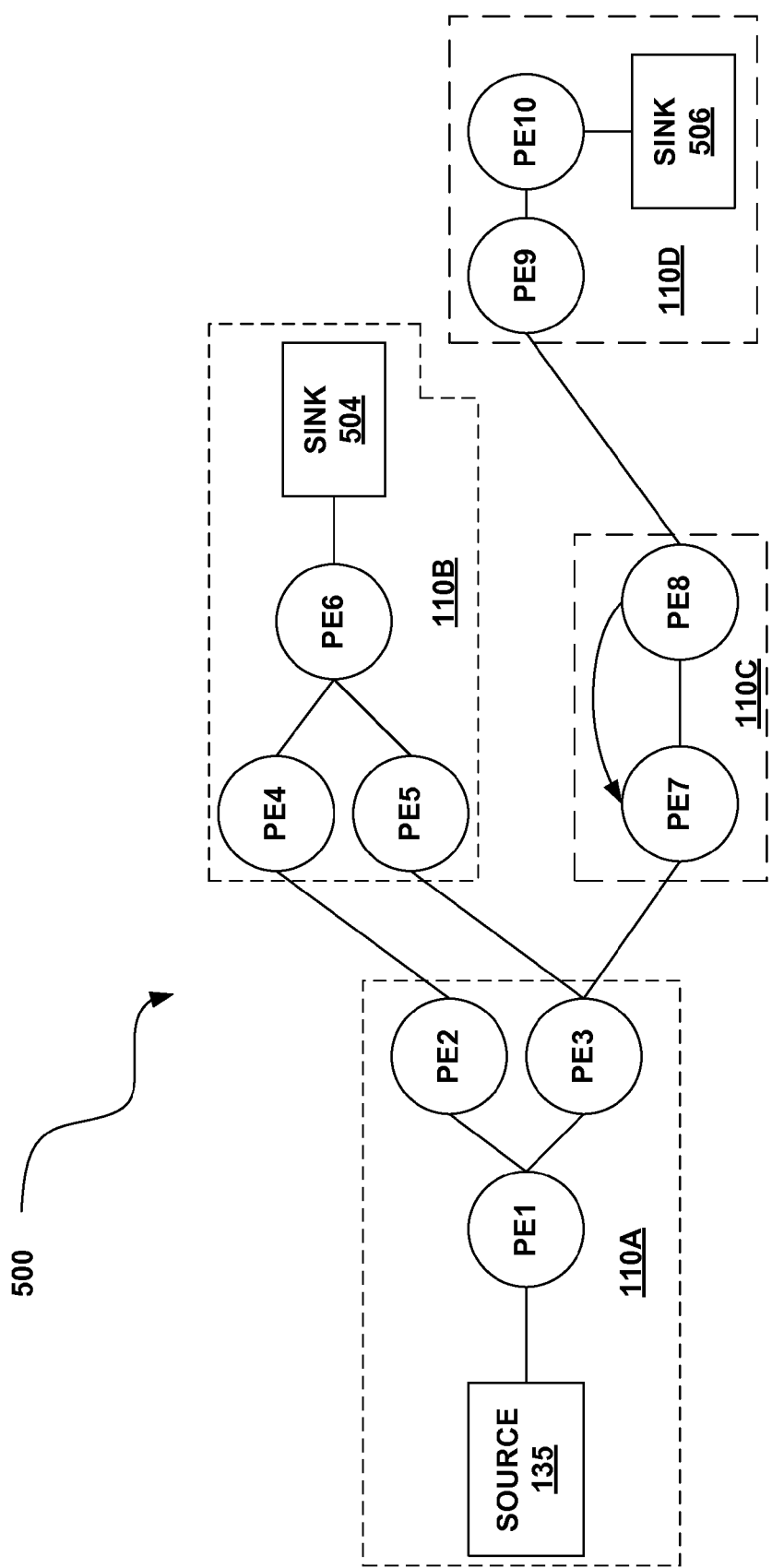
FIG. 5 illustrates a more detailed view of an operator graph in a stream-based application according to various embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins).

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

The tuple received by a particular processing element 235 (FIG. 2) is generally not considered to be the same tuple that is output downstream. Typically, the output tuple is changed in some way. An attribute or metadata may be added, deleted, or changed. However, it is not required that the output tuple be changed in some way. Generally, a particular tuple output by a processing element may not be considered to be the same tuple as a corresponding input tuple even if the input tuple is not changed by the processing element. However, to simplify the present description and the claims, an output tuple that has the same data attributes as a corresponding input tuple may be referred to herein as the same tuple.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D. One example of a stream computing application is IBM®'s InfoSphere® Streams (note that InfoSphere® is a trademark of International Business Machines Corporation, registered in many jurisdictions worldwide).

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
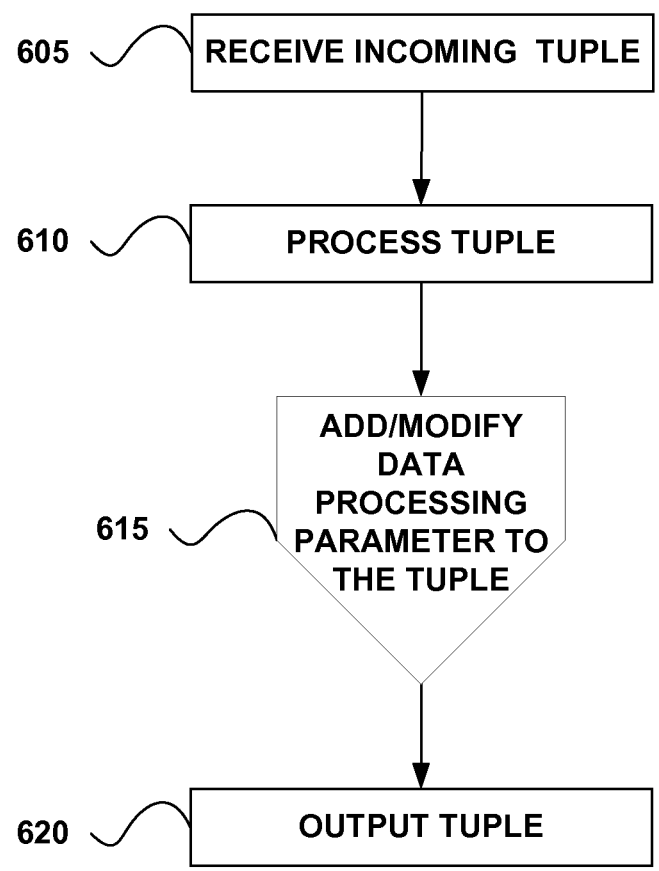
FIG. 6 illustrates a method to determine one or more data processing parameters in a streaming application, according to some embodiments.

FIG. 6 is a flowchart illustrating a method 600 to determine one or more data processing parameters in a streaming application, according to some embodiments. Generally, the operations of method 600 may establish a set of data processing parameters. In some embodiments, data processing parameters may be time-based. In other embodiments, data processing parameters may be based on changes to the data or events caused by the data. Other types of similar data processing parameters are also contemplated. Data processing parameters, according to some embodiments, will be described in further detail in accordance with FIG. 7 below.

As shown in FIG. 6, method 600 may begin at operation 605, when a stream operator receives an input tuple. In some embodiments, the stream operator may add an input timestamp to the tuple. The input timestamp may be added as an additional attribute of the tuple in some embodiments. In other embodiments, the input timestamp may be added to metadata describing the tuple. In yet other embodiments, the timestamp may be added as an attribute to a new tuple that is associated with the input tuple and may flow through the application along with the input tuple. The stream operator may, at operation 610, complete some type of processing on the tuple. For example, the stream operator may search text and pull out certain information from the text that may be important in the particular streaming application.

At operation 615, the stream operator may add or modify one or more data processing parameters describing the processing of the tuple. In some embodiments, the stream operator may add a new data processing parameter. The stream operator may add a new data processing parameter if there are no data processing parameters describing the tuple. The stream operator may add a new data processing parameter if one or more data processing parameters already describe the tuple as long as the new data processing parameter does not already exist. The stream operator may also add a new data processing parameter even when the data processing parameter already exists. This may be the case when the data processing parameter already exists, but the current value is different or multiple values are needed. For example, a stream operator may determine that a timestamp for the receipt of the tuple already exists, but another timestamp may be added in order to determine the processing time for the tuple at that stream operator.

In some embodiments, the stream operator may modify one or more data processing parameters. For example, a data processing parameter may describe the punctuation count of the tuple. The punctuation count may be different at the current stream operator than at the stream operator that last processed the tuple. In such a case, the stream operator may modify the punctuation count so that it contains a current value. At operation 620, the tuple may be output to another stream operator according to the operator graph of the streaming application. Though the shown embodiment illustrates operation 615 occurring prior to operation 620, in some embodiments, the tuple may be output to another stream operator, which may then execute operation 615.

Figure 7:
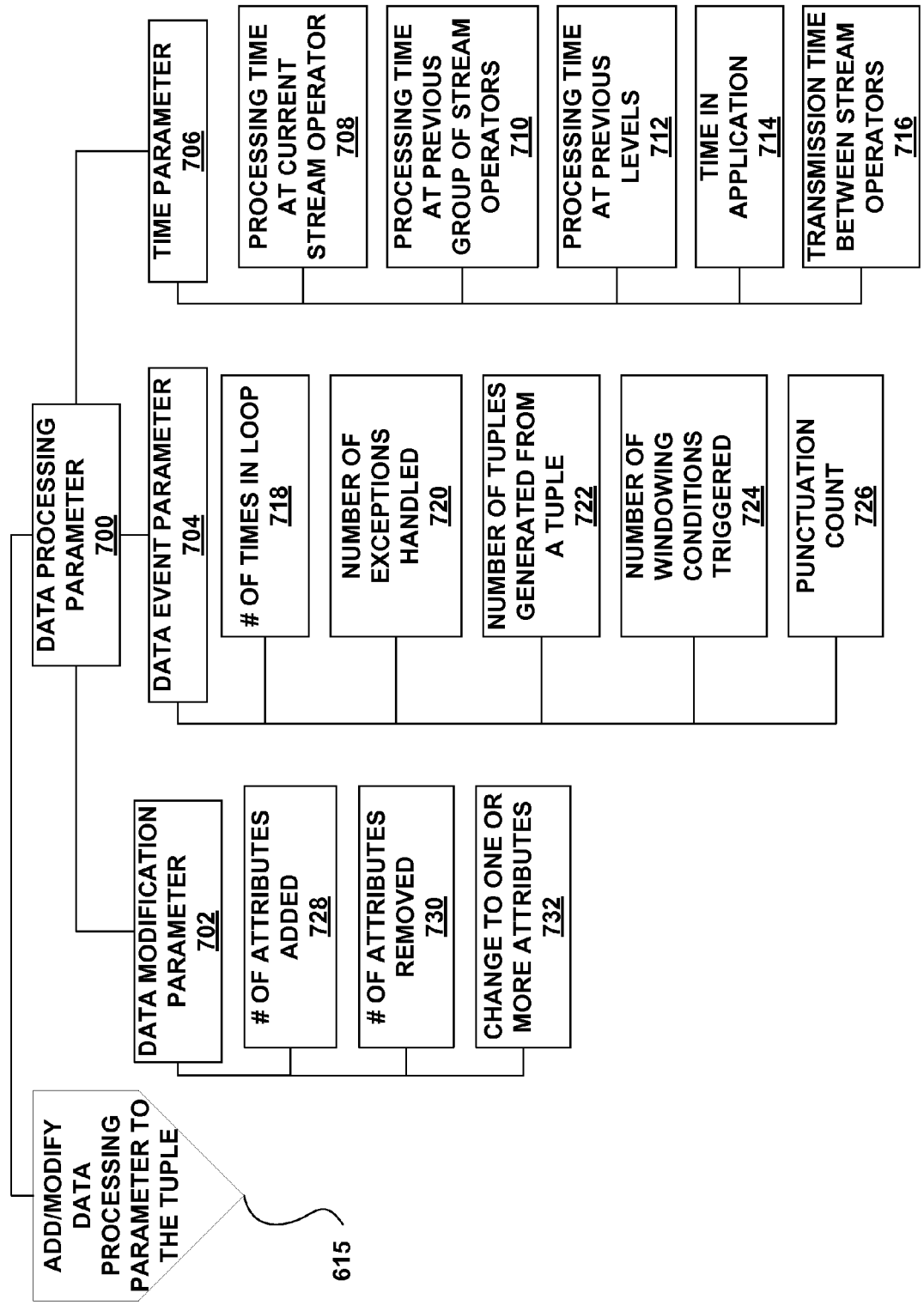
FIG. 7 illustrates examples of data processing parameters corresponding to the method of FIG. 6 to add or modify the one or more data processing parameters to a tuple, according to some embodiments.

FIG. 7 is a diagram illustrating examples of data processing parameters 700 corresponding to operation 615 (FIG. 6) to add or modify one or more data processing parameters 700 to a tuple, according to some embodiments. A data processing parameter 700 may include: a data processing parameter 700 based on a data modification parameter 702, such as data modification parameters 728-732; a data processing parameter 700 based on a data event parameter 704, such as data event parameters 718-726; or (3) a data processing parameter 700 that is a time parameter 706, such as time parameters 708-716. While these data processing parameters 700 are exemplary according to the embodiments disclosed herein, other types of data processing parameters 700 may be possible. Some embodiments may include no data processing parameters 700. Other embodiments may include one or more data processing parameters 700 that are defined by one type of data processing parameter 700 or a combination of a plurality of types 702-706 of data processing parameters 700.

One or more data processing parameters 700 may be defined using a data modification parameter 702, according to some embodiments. A data modification parameter 702, as referred to herein, may include changes made to a tuple. Exemplary data modification parameters 702 are disclosed herein, though other similar types of data modification parameters are contemplated. For example, when a tuple is processed at a stream operator, one or more attributes of the tuple may be modified. Modification of the tuple may include any type of alteration, such as adding one or more attributes, removing one or more attributes, or changing one or more attributes. Changing one or more attributes may include altering the value of the attribute, the type of attribute, or the characteristics of an attribute, e.g., length of a string. The data modification parameter 702 may be based on the type of change. In some embodiments, the data modification parameter may be defined by the number of attributes added 728 or the number of attributes removed 730 from the tuple. In other embodiments, the data modification parameter 702 may be defined by how much the processing has changed one or more attributes 732. In yet other embodiments, there may be a plurality of data processing parameters 702 that are defined based on one or more types of changes 728-732.

One or more data processing parameters 700 may be defined based on data event parameters 704, according to some embodiments. A data event parameter 704, as referred to herein, may include an action caused by processing a tuple. Exemplary data event parameters 704 are disclosed herein, though other similar types of data event parameters are contemplated. An action caused by processing a tuple may include the number of times a tuple goes through a loop 718, the number of exceptions handled 720 as a result of processing the tuple, the number of tuples generated from the tuple 722, the number of windowing conditions triggered 724 by the tuple, or the punctuation count 726. In some embodiments, a data event parameter 700 may include one or more of any of the actions 718-726. In other embodiments, a data event parameter may include one or more of one type of action 718-726.

One or more data processing parameters 700 may be defined based on time parameters 706, according to some embodiments. A time parameter 706, as referred to herein, may include a time-based statistic that may describe the time it took to complete some processing in the current application. Exemplary time parameters 706 are disclosed herein, though other similar types of time parameters are contemplated. A time parameter 706 may include the processing time at the current stream operator 708. In some embodiments, a time parameter 706 may include the processing time at a previous group of stream operators 710. The previous group of stream operator may be either downstream or upstream of the current stream operator. For example, the previous group of stream operators may include a plurality of stream operators that processed the tuple prior to the current stream operator. In other embodiments, a time parameter 706 may include the processing time at one or more previous levels 712 of stream operators. A time parameter 706 may include the entire time the tuple has spent in the streaming application 714. In yet other embodiments, a time parameter 706 may also be defined by the transmission time between one or more stream operators 716. The time parameter 706 may include any or all of the parameters defined in 708-716, according to some embodiments. In some embodiments, the time parameter 706 may include only timestamps, which may allow another stream operator to compute the processing times described above.

Figure 8:
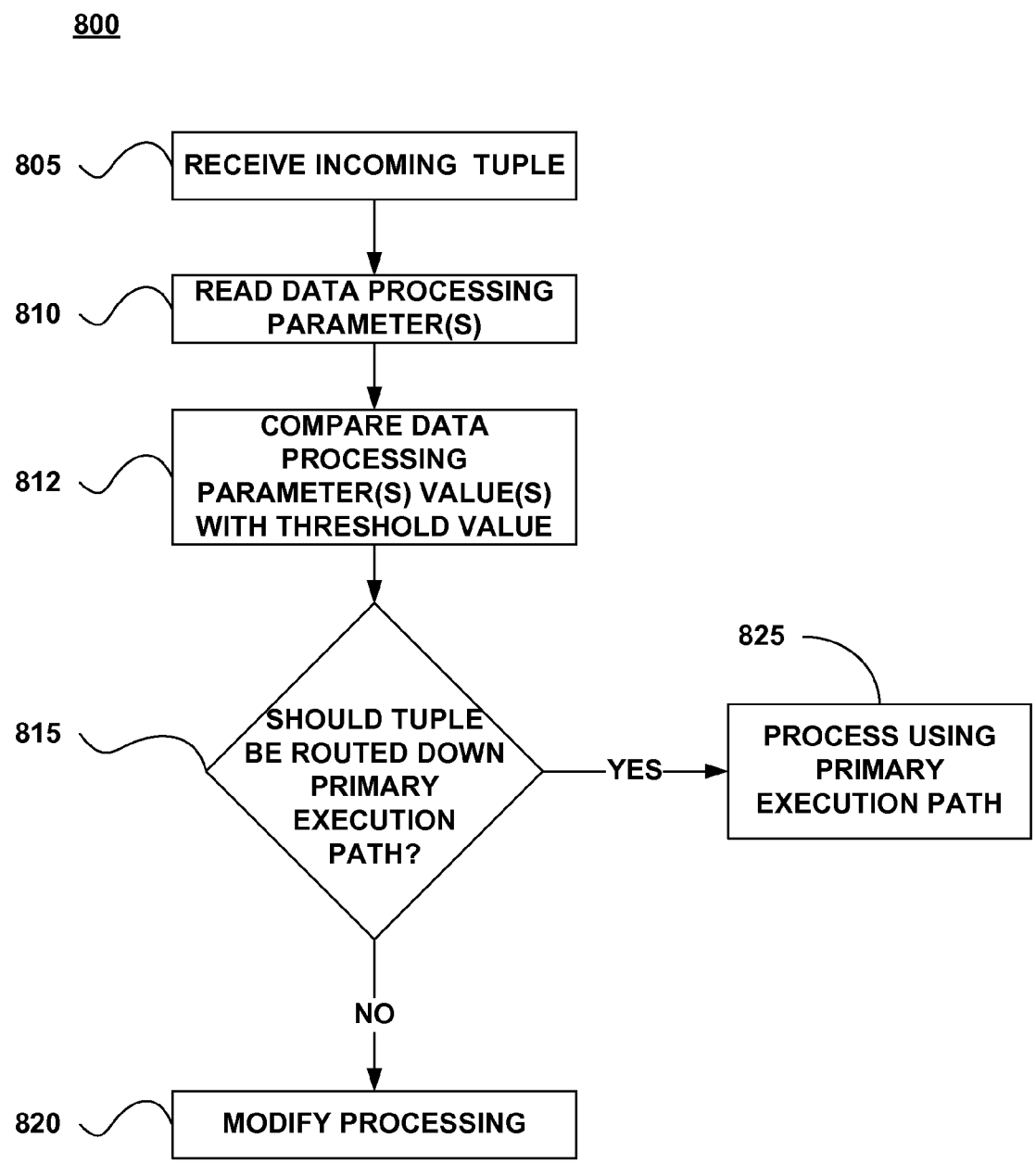
FIG. 8 illustrates a method to route tuples in a streaming application, according to some embodiments.

FIG. 8 is a flowchart illustrating a method 800 to route tuples in a streaming application, according to some embodiments. Generally, the operations of method 800 may modify the processing within an operator graph by routing tuples to an execution path that contains a modified version of processing for the data stream. A stream operator may, for example, route a tuple to a secondary execution path when one or more data processing parameters falls outside a threshold. The threshold may be a system-defined feature in some embodiments, while in other embodiments the threshold may be defined by an application programmer. In yet other embodiments, the threshold may be system-defined, but capable of being overridden by an application programmer.

As shown in FIG. 8, method 800 may begin at operation 805, when a stream operator receives an input tuple. At operation 810, the stream operator may read the one or more data processing parameters. If there are no data processing parameters present, the stream operator may execute method 600 defined above. The values of the data processing parameters may be additional attributes of the tuple in some embodiments. In other embodiments, the values of the data processing parameters may be part of the tuple metadata. In yet other embodiments, the values of the data processing parameters may be part of one or more tuples that was generated to contain the values of one or more data processing parameters for a particular tuple. At operation 812, the stream operator may compare the value of one or more of the data processing parameters with a corresponding threshold value.

At operation 815, the stream operator may determine whether the values of the data processing parameters indicate that processing of the tuple should be modified. The determination may result in a modification if the value of one or more of the data processing parameters falls outside a threshold for the corresponding data processing parameter. The threshold value for the various data processing parameters may be provided as a default value by the streaming application system. In some embodiments, the system-defined default threshold may be configurable by the application programmer. In other embodiments, there may be no system-defined threshold value, but an application programmer may be able to supply the threshold value. In yet other embodiments, the threshold value may be determined based on application metrics about the streaming application. If the value of the data processing parameter as determined at operation 812 falls outside the threshold, then processing of the tuple may be modified at operation 820. Modifying processing may include routing the tuple down an execution path that contains one or more stream operators that are configured differently than a primary execution path. For example, the modified processing may include either more or fewer stream operators than the primary execution path in some embodiments. In other embodiments, the modified processing may include more or less extensive processing than the primary execution path. In yet other embodiments, modified processing may be a different type of processing. If the value of the data processing parameter does not fall outside the threshold value, then the tuple may be routed to the primary execution path at operation 825. Routing, as referred to herein, may refer to a stream operator outputting a tuple such that it is received as an input to another stream operator.

Figure 9:
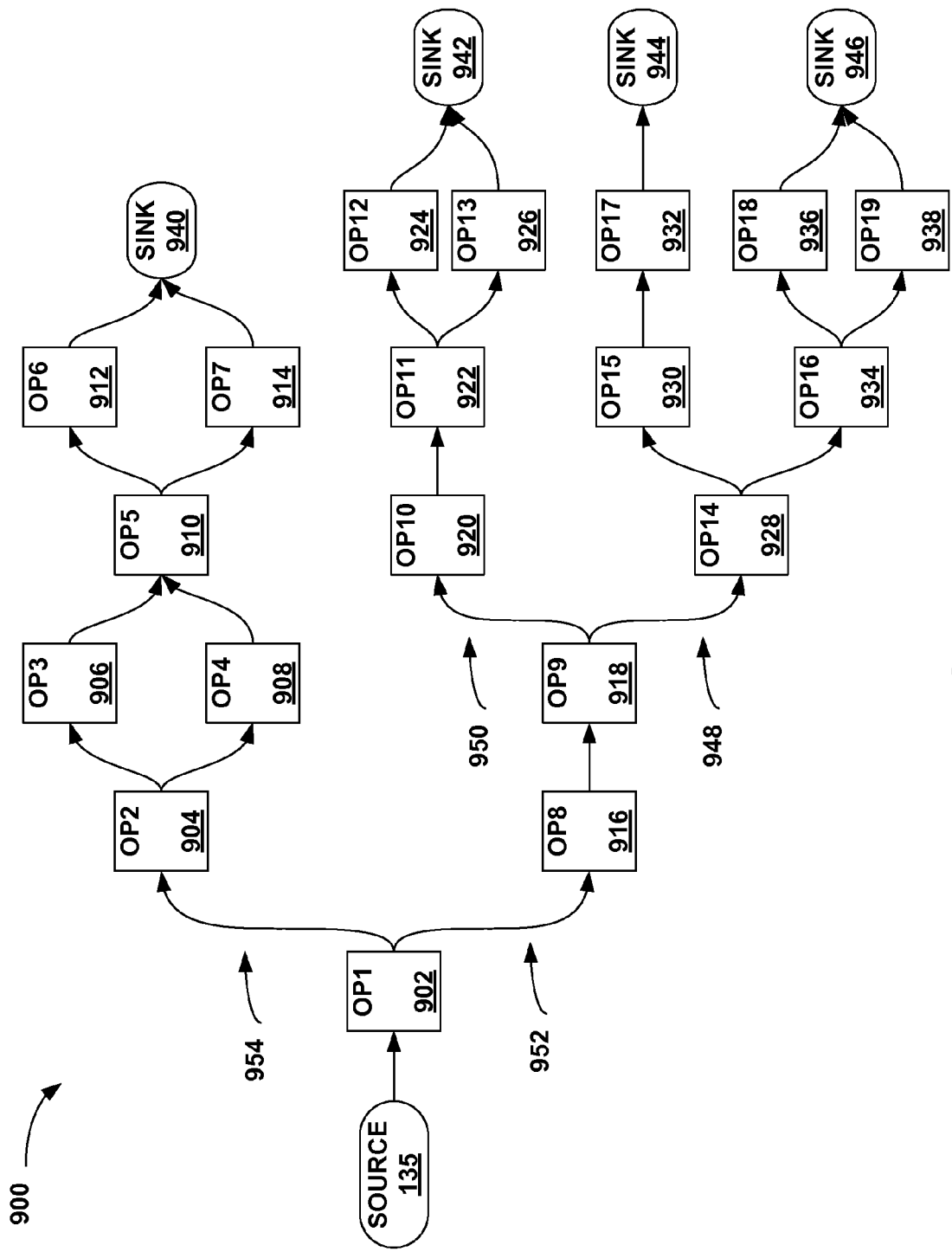
FIG. 9 illustrates a more detailed view of an operator graph for a streaming application in which processing of tuples may be modified based on one or more data processing parameters, according to some embodiments.

FIG. 9 illustrates a more detailed view of an operator graph 900 of a streaming application in which processing of tuples may be modified based on one or more data processing parameters, according to some embodiments. Operator graph 900 will be discussed by way of an example embodiment—a sample streaming application in which a news company is examining a news feed.

Operator graph 900 may include a source 135, one or more stream operators 902-938, and one or more sinks 940-946. In some embodiments, stream operator 902 may receive a data stream from source 135. The data stream may include a news feed. The individual tuples of the data stream may include the text of a news article. Depending on the source of the news, stream operator 902 may output a particular tuple to execution path 954, which includes stream operators 904-914. The execution path 954 may be configured to complete some type of processing on a particular tuple. For example, the execution path 954 may compile key terms and data about the article.

Execution path 952 may include stream operators 916-938 and may also include execution paths 948 and 950. Execution path 952 may process tuples that include news articles for different sources than those processed by execution path 954. Stream operator 918 of execution path 952 may be configured in accordance with this disclosure to determine how to route the tuples it receives to either execution path 948 or 950. Stream operator 918 may examine one or more data processing parameters, e.g., data processing parameters 700, to make this determination. For example, stream operator 916 may search the text of the article and compile the location names, people names, and organization names. Stream operator 918 may then look at the one or ore data processing parameters for the tuple it receives. The tuple may, for example, have data processing parameters related to the processing time at stream operator 916. In this particular streaming application, there may be a threshold for processing time which could serve as an indication that stream operator 916 may be compiling a large amount of information if the processing time falls outside that threshold. If the processing time does fall outside the threshold, stream operator 918 may route the particular tuple to execution path 948 for some type of different processing than execution path 950 (which may be for cases with less information). The tuple may then proceed through execution path 950. If the processing time falls within the threshold, then stream operator 918 may be routed to execution path 950.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: (a) an object oriented programming language such as Java, Smalltalk, C++, or the like; (b) conventional procedural programming languages, such as the "C" programming language or similar programming languages; and (c) a streams programming language, such as IBM Streams Processing Language (SPL). The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

Although embodiments are described within the context of a stream computing application, this is not the only context relevant to the present disclosure. Instead, such a description is without limitation and is for illustrative purposes only. Of course, one of ordinary skill in the art will recognize that embodiments of the present invention may be configured to operate with any computer system or application capable of performing the functions described herein. For example, embodiments of the invention may be configured to operate in a clustered environment with a standard database processing application.

While the foregoing is directed to exemplary embodiments, other and further embodiments of the invention may be devised without departing from the basic scope thereof, and the scope thereof is determined by the claims that follow.

What is claimed is:

1. A method for processing a stream of tuples, comprising:
receiving a stream of tuples to be processed by a plurality of processing elements operating on one or more computer processors, each processing element having one or more stream operators;
determining at the first stream operator, one or more parameters that represent a processing history of a tuple at the first stream operator;
associating the one or more parameters with the tuple;
comparing a value of the one or more parameters and a corresponding threshold value;
determining by the second stream operator, in response to the value of the one or more parameters falling outside the corresponding threshold value, to modify processing of the tuple; and
modifying processing of the tuple by routing the tuple to a modified execution path.

2. The method of claim 1, wherein the first stream operator is a plurality of stream operators.

3. The method of claim 1, wherein the one or more parameters are time-based.

4. The method of claim 3, wherein the one or more parameters include an amount of time to process the tuple at the first stream operator.

5. The method of claim 3, wherein the one or more parameters include an amount of time to process the tuple at a previous group of stream operators.

6. The method of claim 3, wherein the one or more parameters include transmission time between a plurality of stream operators.

7. The method of claim 3, wherein the one or more parameters include how long the tuple has been in an application.

8. The method of claim 1, wherein the one or more parameters are based on modifications to the tuple.

9. The method of claim 8, wherein the one or more parameters include a count of how many attributes have been added to the tuple.

10. The method of claim 8, wherein the one or more parameters include how many attributes have been removed from the tuple.

11. The method of claim 8, wherein the one or more parameters include changes to one or more attributes of the tuple.

12. The method of claim 1, wherein the one or more parameters are based on one or more events triggered by the tuple.

13. The method of claim 12, wherein the one or more parameters include a count of how many times the tuple has flowed through an execution loop.

14. The method of claim 12, wherein the one or more parameters include a count of how many exceptions the tuple has caused an application to handle.

15. The method of claim 12, wherein the one or more parameters include a count of how many tuples were generated from the tuple.

16. The method of claim 1, wherein the modifying processing of the tuple includes routing the tuple to a modified execution path.

17. The method of claim 1, wherein associating the one or more parameters with the tuple includes modifying metadata for the tuple.

\* \* \* \* \*